Patented Oct. 28, 1924.

1,513,014

UNITED STATES PATENT OFFICE.

ELIAS ANTHON CAPPELEN SMITH, OF NEW YORK, N. Y., ASSIGNOR TO GUGGENHEIM BROTHERS, A COPARTNERSHIP, OF NEW YORK, N. Y.

RECOVERY OF NITRATE FROM CALICHE.

No Drawing.   Application filed October 17, 1921.   Serial No. 508,324.

*To all whom it may concern:*

Be it known that I, ELIAS ANTHON CAPPELEN SMITH, a citizen of the United States of America, residing at New York city, in the county of New York and State of New York, have invented certain new and useful Improvements in the Recovery of Nitrate from Caliche; and I do hereby declare the following to be a full, clear, and exact description of the invention, such as will enable others skilled in the art to which it appertains to make and use the same.

This invention relates to improvements in the extraction and recovery of nitrate from caliche, and involves improvements which are not only particularly adapted to installations of small or moderate capacity, but also to installations of the largest magnitude.

In its preferred and complete form, the invention includes a cyclic process in which the nitrate is extracted from caliche by cold or tepid leaching, and in which the nitrates are recovered from the solution in crystalline form by refrigeration, as well as a process in which the refrigeration of the strong solution containing the nitrate is in part accomplished by heat interchange with the cold mother liquor which is thereby warmed before its return for further use in the leaching operation.

The method of extraction of nitrates from caliche, which is at present almost universally used, consists in boiling the caliche together with the mother liquors from former crystallizations so as to obtain a strong solution or "caldo," and the subsequent cooling of such "caldo" and the depositing out of its dissolved nitrate during a period of five or six days. This process is attended with heavy incidental losses, such as the sacrifice of about 33% of the total nitrate present in the caliche treated, while a considerable portion of the caliche is at present rejected on account of its fine state of division.

The present invention largely overcomes or avoids the difficulties and objections of such prior methods of extraction. The extraction of the nitrate from the caliche by boiling is wholly dispensed with, together with the subsequent slow cooling for a long period of time, while the heavy incidental losses in unextracted nitrate and in the fines are largely avoided. The fines, which are regarded as extremely difficult of treatment in the present methods, are made fully available in the practice of the present invention. By the expression "fines" is to be understood not only the fine material resulting at any step of the process by disintegration of the caliche under treatment, as, for instance, the fine material which in the present practice passes through and gathers under the false bottom of the boiling tank, but also all of that portion of the caliche broken on the pampa which is at present rejected on account of its fine state of division.

In carrying out the cyclic process the caliche, crushed to a size appropriate to the method of leaching adopted, will be exposed, together with its "fines" to the dissolving action of mother liquor returned from the crystallization process or of a solution whose nitrate content is intermediate between that of the mother liquor and that of the solution suitable for recovery treatment. This dissolving or extraction is carried out in such a manner and in such forms of apparatus (appropriate to the method of leaching adopted) as to bring the available nitrate in the caliche into substantially complete solution. This extraction or leaching of the caliche is carried out at atmospheric or tepid temperatures.

The caliche under treatment, after it has been subjected to extraction for the removal of the nitrate, will be subjected to a sufficient number of wash waters of graded nitrate strength to remove and displace to a great extent the stronger solution produced in the leaching operation. With this leaching procedure and with rational application of wash waters an extraction of at least 90% of the available nitrate is readily obtained and the extraction may be as high as 95%.

It will be understood that, contrary to the usual practice, all of the caliche material broken on the pampas may be charged into the leaching apparatus, thus increasing by a large fraction the amount of caliche commonly treated, inasmuch as the invention permits full use to be made of the "fines" which have heretofore, in many cases, been entirely neglected. Moreover, inasmuch as extremely high recovery of nitrate from caliche is realized by the present invention, it will be economically profitable to work a much lower grade of caliche than is feasible in the prevailing practice. For example, in some instances, the so-called "over-burden" itself (that is to say, the outer stratum of material overlying the caliche and which is usually rejected) may be rich enough in nitrate to warrant treatment along with the caliche proper, thus greatly diminishing the cost of the mining operation.

The enriched liquors withdrawn from the leaching apparatus are sent to the nitrate recovery plant where a portion of their content of nitrate is removed by crystallization, thereby forming a fresh quantity of mother liquor or treatment solution. This crystallization of the nitrate from the saturated or nearly saturated solution received from the leaching plant is brought about by cooling the solution by refrigeration to a lower temperature than that of the cold or tepid leaching. In order for the recovery plant to operate to best advantage, it should not only refrigerate the cool or tepid saturated or nearly saturated solutions, in order to induce crystallization, but it must also supply such additional refrigeration as is necessary to balance the heat of crystallization of the sodium nitrate crystals.

The cyclic process is also carried out with circulation of the saturated or nearly saturated solutions into heat interchanging relation with the cold mother liquor from the crystallization plant. By using heat interchangers, the mother liquor returning from the crystallization tanks to the leaching tanks will be warmed, and the refrigeration stored in the refrigerated weak mother liquor will be transferred to the strong solution passing from the leaching tanks to the refrigerator tanks, so that the strong solution is thus cooled to a large degree before entering the refrigerator. By the use of heat interchangers in which the strong solution and the weak mother liquor thus pass in counter current relation to each other, the weak mother liquor can be warmed to a temperature approximating that of the strong solution from the leach tanks, and the strong solution can similarly be cooled to a temperature approaching that of the refrigerator tanks.

The mother liquor will thus emerge from the heat interchangers at a somewhat lower temperature than atmospheric. This mother liquor can be used to advantage as the cooling medium in the condenser for the refrigerant (i. e., the ammonia vapors) in which cooling medium the heat of condensation of the vapors of the refrigerant will in turn heat the mother liquor so that it will have a certain quantity of surplus heat stored in it when it returns to the leaching tanks; or, where the mother liquor is circulated through a series of tanks, it may be warmed between successive tanks, or before entering the last leaching tank, thus raising its temperature during or toward the end of the leaching operation, and increasing the strength of the final strong solution. The mother liquor may also be heated from some other source of waste heat and a certain quantity of surplus heat stored in it. The amount of surplus heat will preferably be sufficient or more than enough to satisfy the heat necessarily absorbed in dissolving the nitrate from the caliche. In the refrigerators and interchangers themselves, the refrigeration applied or recovered must similarly compensate for this absorbed heat, in order to bring about the crystallization of the nitrate.

The sequence of operation is shown in the following flow sheet:

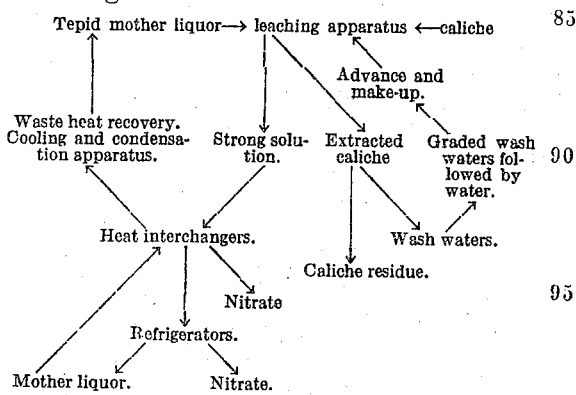

As illustrated in the flow sheet, the strong solution received from the leaching apparatus enters the heat interchangers at a temperature, for example, of 25° C. The heat interchangers may be of any appropriate type, but preferably they are of such construction as to present a large surface of contact and a prolonged contact surface between the solutions passing therethrough in counter current flow. In these heat interchangers the strong solutions are cooled by the counter flow against colder mother liquor returning from the refrigeration tanks. The temperature of the strong solution may, for example, be reduced in the heat interchange system, from 25° C. to about 6° C., so that a considerable part of the nitrate will be precipitated and recovered in the tanks of the heat interchanging system in a substantially pure form.

In the refrigerator proper the temperature will be further lowered, for example, to about 0° C., and a further quantity of nitrate will be precipitated. It will, of course, be understood that, in its passage through the heat interchangers and the refrigerator, the solution loses but part of its nitrate and a large part still remains dissolved in the mother liquor and returns again to re-enter the solution cycle. The nitrate precipitated in the heat interchangers and the refrigerator may be discharged therefrom automatically and continuously by any suitable mechanical arrangements. The refrigerator may be provided with any suitable means of refrigeration, as, for instance, by means of ammonia vaporization or cold brine solution. The system of heat interchangers and refrigerators, together with the intermediate connections, may be insulated to eliminate atmospheric influences. Different forms of heat interchangers and refrigerating devices are well known and need not be specifically described, for example, liquid ammonia may be vaporized at low pressure, in the usual manner, in the refrigerator coils, and then compressed and condensed in the customary manner incident to ammonia cooling processes, and, as above described, the heat of compression and condensation may be utilized in heating the mother liquors to assist in the leaching operation.

The mother liquor from the refrigerators is preferably returned by counterflow through the heat interchangers where it is warmed to, say 20°, more or less. The stored refrigeration in the mother liquor is thus simultaneously transmitted to the fresh incoming strong solution. From the heat interchangers, or, in certain cases from the refrigerators themselves, the mother liquor passes through the ammonia condenser (which, for example, be of the shell and tube type) or through other forms of waste heat recovery apparatus where it serves as the cooling medium. When it passes through the ammonia condenser, it serves to condense and liquefy the ammonia while at the same time it is itself raised to a temperature intermediate between its entrance temperature and the temperature of the condensing refrigerant, so that it returns to the leaching tanks at a correspondingly increased temperature.

In the extraction of caliche with water not only does the nitrate dissolve, but all the other soluble constituents pass into solution. It is not objectionable for these salts to build up in the solutions provided they do not contaminate the nitrate product obtained from the refrigerating process. The chief impurity which is encountered in the solutions is sodium chloride, together with lesser amounts of sulfates, potassium salts, borates, iodates, and magnesium. For example, the concentrations of the major foreign salts dissolved in a mother liquor produced in the operation of the refrigeration process, were found, in one instance, to be a total of 200 grams per liter of chlorine expressed as sodium chloride, and a total of 60 grams per liter of sulfate expressed as sodium sulfate.

The sodium chloride (which occurs in the caliche in large quantities) does not interfere in the operation of the refrigerating cycle, inasmuch as its solubility (in the presence of sodium nitrate) increases as the temperature decreases, so that there is no tendency for it to precipitate along with the nitrate.

Sodium sulfate, however, (which also may occur in considerable quantities in the caliche) presents solubility relations somewhat similar to those of the nitrate, in that, below a certain point, (which in the normal solution encountered is in the neighborhood of 8° C.,) its solubility decreases as the temperature is lowered. The concentrations of sodium sulfate encountered in the solutions are, however, such that down to a temperature of at least 4° C. there is no substantial danger of precipitation. Consequently, the sodium nitrate crystals contained in the heat interchanger are practically free from precipitated sulfate.

In the refrigerators, a further precipitation of the sodium nitrate crystals will occur, and, at the same time, there may be precipitated, at the lower temperatures, a quantity of sodium sulfate, which may thereafter be removed by processes understood in the art. However, in the preferred practice of the invention, with the production of solutions, in the leaching, of concentrations sufficiently high in nitrate, the concentration of sulfate in the solutions may be maintained below such a value that refrigeration at or below 0° C. can be accomplished with the production of nitrate in a commercially pure and marketable form. Consequently, in accordance with this additional feature of the invention, by proper regulation of temperature, a product substantially free from sulfate can also be obtained in the refrigerators. This feature of the invention is of particular advantage, inasmuch as it avoids the necessity that would otherwise exist of subsequent purification of the nitrate crystals from accompanying precipitated sulfate, and insures in a simple and economical way the obtaining of a correspondingly pure product substantially devoid of contaminations, from the refrigerators, in the orderly and regular functioning of the system.

It will thus be seen that the present invention provides a new cyclic process of leaching nitrate from caliche at atmospheric or tepid temperatures and of crystallizing the nitrate from the resulting solution by refrigeration, with production of a mother liquor available for further use in the leaching operation, and with heat interchange of the cold mother liquor from the refrigerator and the warmed saturated liquor from the leaching operation. The leaching, as hereinbefore stated, may be carried out without extraneous heat, that is to say, at or about ordinary atmospheric temperatures, or the leached liquor may be heated before or during the leaching operation, particularly where a source of waste heat is available. In any event, however, the surplus heat, if any, thus imparted to the leached solutions need not exceed the amount required to maintain the solutions at working temperatures up to but not substantially higher than about 60° C., which includes the range of temperatures herein referred to as tepid.

I claim:

1. The method of recovering sodium nitrate from caliche which comprises leaching the caliche at atmospheric or tepid temperatures with mother liquor and thereby obtaining a saturated or approximately saturated solution, cooling the solution by refrigeration, regulating the rate and temperature of cooling to avoid any substantial precipitation of sulfate with the nitrate, and returning the mother liquor to the leaching step of the process.

2. The method of recovering nitrate from caliche which consists in leaching the caliche at atmospheric or tepid temperatures; conveying the strong solution thus obtained to a refrigerator wherein it is cooled to effect a precipitation of a portion of the dissolved nitrate, and effecting a heat interchange between the strong solution on its way to the refrigerator and the weak mother liquor on its way from the refrigerator.

3. The method of recovering nitrate from caliche which comprises leaching the caliche at atmospheric or tepid temperatures with mother liquor and thereby obtaining a saturated or approximately saturated solution, cooling the solution by refrigeration and thereby separating out nitrate, regulating the rate and temperature of cooling to avoid any substantial precipitation of sulfate with the nitrate, returning the mother liquor to the leaching step of the process, and utilizing the cool mother liquor as a cooling medium for the condensation of the refrigerant employed in the refrigeration step and, at the same time, raising the temperature of the mother liquor correspondingly.

4. The method of recovering nitrate from caliche which comprises leaching the caliche at atmospheric or tepid temperatures with mother liquor and thereby obtaining a saturated or approximately saturated solution, cooling the solution by refrigeration and thereby separating out nitrate, effecting a heat interchange between the strong solution on its way to the refrigeration step and the weak mother liquor on its way from the refrigeration step, and further utilizing the cool mother liquor on its way from the refrigeration step as the cooling medium for the condensation of the refrigerant employed in the refrigeration step.

5. In the method described in claim 1, the carrying out of the cooling in successive stages, with separation of substantially pure nitrate in the initial stage or stages and separation of nitrate which may also contain sulphate in a later stage or stages.

6. In the method described in claim 1, the carrying out of the cooling in successive stages, one of which involves the heat interchange of the strong liquor from the leaching operation with cold mother liquor, and another of which involves refrigeration at a lower temperature with a resulting production of such cold mother liquor.

7. The cyclic method of recovering sodium nitrate from caliche which comprises leaching the caliche with mother liquor at atmospheric or tepid temperatures, subjecting the resulting solution to cooling in successive stages for the separation of nitrate therefrom and returning the resulting mother liquor to the leaching operation, the mother liquor from the final cooling operation being circulated in indirect contact with the solution obtained by leaching and being thereby warmed while effecting an intermediate cooling of the solution and a partial crystallization of nitrate therefrom.

8. The method of recovering nitrate from caliche which comprises leaching the caliche at atmospheric or tepid temperatures with mother liquor and thereby obtaining a saturated or approximately saturated solution, cooling the solution by refrigeration and thereby separating out the nitrate, regulating the rate and temperature of cooling to avoid any substantial precipitation of sulfate with the nitrate, returning the mother liquor to the leaching step of the process, effecting a heat interchange between the strong solution on its way to the refrigeration step and the weak mother liquor on its way from the refrigeration step, and further utilizing the cool mother liquor on its way from the refrigeration step as the cooling medium for the condensation of the refrigerant employed in the refrigeration step and, at the same time, raising the temperature of the mother liquor correspondingly.

9. The method of recovering nitrate from caliche which comprises leaching the caliche at atmospheric or tepid temperatures with mother liquor and thereby obtaining a saturated or approximately saturated solution, cooling the solution by refrigeration and thereby separating out the nitrate; regulating the rate and temperature of cooling to avoid any substantial precipitation of sulfate with the nitrate, returning the mother liquor to the leaching step of the process, and effecting a heat interchange between the strong solution on its way to the refrigeration step and the weak mother liquor on its return from the refrigeration step to the leaching step.

In testimony whereof I affix my signature.

ELIAS ANTHON CAPPELEN SMITH.